(12) United States Patent
Leger (10) Patent No.: US 11,783,255 B2
(45) Date of Patent: *Oct. 10, 2023

(54) SYSTEM AND METHOD FOR EXECUTING PARALLEL WORKFLOWS

(71) Applicant: The Toronto-Dominion Bank, Toronto (CA)

(72) Inventor: Simon Karczewski Leger, Montreal (CA)

(73) Assignee: The Toronto-Dominion Bank, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/820,943

(22) Filed: Aug. 19, 2022

(65) Prior Publication Data

US 2022/0391812 A1 Dec. 8, 2022

Related U.S. Application Data (63) Continuation of application No. 17/248,712, filed on Feb. 4, 2021, now Pat. No. 11,455,585.

(51) Int. Cl.
    *G06Q 10/00* (2023.01)
    *G06Q 10/0631* (2023.01)
    *G06Q 10/10* (2023.01)

(52) U.S. Cl.
    CPC ....... *G06Q 10/06316* (2013.01); *G06Q 10/10* (2013.01)

(58) Field of Classification Search
    CPC .. G06Q 10/10; G06Q 10/063; G06Q 10/0631; G06Q 10/06316
    See application file for complete search history.

(56) References Cited

U.S. PATENT DOCUMENTS

| | | |
|---|---|---|
| 10,096,069 B1 | 10/2018 | Clawson, II et al. |
| 10,102,588 B1 | 10/2018 | Gonsalves et al. |
| 10,650,465 B1 | 5/2020 | Bolden et al. |

(Continued)

FOREIGN PATENT DOCUMENTS

KR   20020013628   2/2002

OTHER PUBLICATIONS

Zhu, Y., Yang, H. & Yin, B. (2014). Method for defining multiple homogeneous activities in distributed workflow management system. Computer Modelling and New Technologies, 18(1), 121-128. (Year: 2014).

*Primary Examiner* — William S Brockington, III
(74) *Attorney, Agent, or Firm* — CPST Intellectual Property Inc.; Brett J. Slaney (57) ABSTRACT

A system and method are provided for executing parallel electronic workflows. The method includes receiving a request from a client device to add or change data for an entity, the data being associated with a plurality of products or services, each product or service having a separate, independent electronic workflow. The method also includes initiating each of the workflows by interfacing with the plurality of electronic workflows, receiving inputs related to the request and, for each input, interacting with the workflows, wherein at least one input has overlapping data required in a plurality of the electronic workflows. The method also includes, prior to executing an outcome of the plurality of electronic workflows, determining a result for the client device based on the data in the request, providing to the client device an indication of the result, and receiving a response to the indication.

20 Claims, 9 Drawing Sheets

(56) References Cited

U.S. PATENT DOCUMENTS

| | | |
|---|---|---|
| 2012/0101852 A1 | 4/2012 | Albert |
| 2012/0137309 A1 | 5/2012 | Makam |
| 2014/0222469 A1 | 8/2014 | Stahl et al. |
| 2016/0253209 A1 | 9/2016 | Eymann |
| 2016/0292681 A1 | 10/2016 | Bryson |
| 2019/0391827 A1 | 12/2019 | Simanovich et al. |
| 2020/0118137 A1 | 4/2020 | Sood |
| 2021/0406831 A1 | 12/2021 | Alabdrabalnabi |

SYSTEM AND METHOD FOR EXECUTING PARALLEL WORKFLOWS

CROSS-REFERENCE TO RELATED APPLICATION(S)

This application is a Continuation of U.S. patent application Ser. No. 17/248,712 filed on Feb. 4, 2021, the contents of which are incorporated herein by reference in its entirety.

TECHNICAL FIELD

The following relates generally to executing parallel workflows.

BACKGROUND

Electronic workflows executed by an organization, for providing functionality or services, are often independent and executed separately. This may be as a result of the workflows being handled by different areas of an organization or of having legacy issues or requirements, such as when obtaining authentications or approvals.

For example, current digital experiences for insurance policy holders (or customers looking to become policy holders) are considered very linear. Typically, each insurance policy and each change to a policy is dealt with in a separate workflow. Each workflow often shares at least one step with other workflows, such as consents, approvals, document submissions, summaries, etc. Because of this, users may feel it is easier to contact a live advisor who is often able to work through multiple requests or changes at the same time.

BRIEF DESCRIPTION OF THE DRAWINGS

Embodiments will now be described with reference to the appended drawings wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

There is a need to provide a more flexible digital experience to allow customers to make multiple changes in parallel and to enable the customer to continually assess, reassess and optimize their product or service, e.g., to dynamically react to changing life circumstances like moving, purchasing new vehicles, adding family members, etc. in the context of insurance policies.

A backend system is described herein that can avoid the linear "tunnels" associated with parallel workflows executed by an enterprise or other organization by enabling multiple additions or changes to be considered in parallel before executing any operations that would normally be common to all or most of the workflows. For example, current insurance-related transaction flows are executed linearly, with customers required to go through each quote or update process individually with it being difficult to determine how multiple products or policies look together. This can lead to unnecessary calls to a customer service channel to have a live agent determine multiple parallel quotes by accessing multiple user interfaces.

The backend system described herein allows a customer to make multiple changes to multiple policies in parallel and be able to assess an overall impact of these changes. For example, a "shopping cart" can be used to update multiple policies at the same time when a customer changes their home address or has a change in life situation such as a new job or marriage. This can be as simple as applying an address change across the policies to seeing how this affects home and auto policies.

The backend system also allows various front-end tools to be implemented, such as a coverage assessment tool to optimize coverage across multiple types of policies while enabling multiple workflows behind the scenes to be advanced without executing an ultimate result while providing accurate information regarding such results. In this way, a proactive approach can be taken to engaging customers and in entering a transaction to add or optimize coverage or to make changes to their profile that could affect their policies.

This backend system can therefore provide a proactive tool to engage customers more often and allow them to experiment with changes digitally without the pressure of a live advisor. Similarly, this reduces the burden on customer service channels operated by such live advisors. The backend functionality also breaks the user out from the linear tunnels normally associated with buying or making changes to insurance policies.

The backend system can also be used to initiate and launch into another workflow that may have overlapping information or inputs, like mortgage pre-approvals when there is overlapping information required. For example, the tool could suggest that the user only requires a few additional questions to also get a mortgage pre-approval. When selecting this option, some information can then be filled in for the next transaction flow and the user dynamically taken to that workflow.

It will be appreciated that while examples provided herein are directed to insurance policies and financial-related transactions, the principles discussed herein equally apply to other electronic workflows that can be implemented and advanced in parallel for a client or customer of an enterprise or organization. For example, the principles discussed herein can be readily adapted to digital media providers (e.g., phone, television, internet, mobile, home security), customer onboarding with multiple parallel systems, or other bundles of products and/or services (e.g., financial transaction accounts, credit accounts, investment accounts), etc.

Certain example systems and methods described herein are able to execute parallel electronic workflows. In one aspect, there is provided a server device for executing parallel electronic workflows. The device includes a processor, a communications module coupled to the processor, and a memory coupled to the processor. The memory stores computer executable instructions that when executed by the processor cause the processor to receive via the communications module, a request from a client device to add or change data for an entity, the data being associated with a plurality of products or services, each product or service having a separate, independent electronic workflow. The memory also stores computer executable instructions that when executed by the processor cause the processor to initiate via the communications module, each of the plurality of independent electronic workflows by interfacing with the plurality of electronic workflows on behalf of the client device; and receive via the communications module, a plurality of inputs related to the request and, for each input, interact via the communications module with the plurality of independent electronic workflows, wherein at least one input has overlapping data required in a plurality of the electronic workflows The memory also stores computer executable instructions to cause the processor to, prior to executing an outcome of the plurality of electronic workflows, determine a result for the client device based on the data in the request; provide to the client device via the communications module, an indication of the result; and receive a response to the indication via the communications module, wherein when the response confirms execution of the outcome, the server device interfaces with the plurality of electronic workflows via the communications module to add or change the data according to the request on behalf of the client device.

In another aspect, there is provided a method of executing parallel electronic workflows. The method is executed by a server device having a communications module. The method includes receiving via the communications module, a request from a client device to add or change data for an entity, the data being associated with a plurality of products or services, each product or service having a separate, independent electronic workflow. The method also includes initiating via the communications module, each of the plurality of independent electronic workflows by interfacing with the plurality of electronic workflows on behalf of the client device; and receiving via the communications module, a plurality of inputs related to the request and, for each input, interacting via the communications module with the plurality of independent electronic workflows, wherein at least one input has overlapping data required in a plurality of the electronic workflows. The method also includes, prior to executing an outcome of the plurality of electronic workflows, determining a result for the client device based on the data in the request; providing to the client device via the communications module, an indication of the result; and receiving a response to the indication via the communications module, wherein when the response confirms execution of the outcome, the server device interfaces with the plurality of electronic workflows via the communications module to add or change the data according to the request on behalf of the client device.

In another aspect, there is provided non-transitory computer readable medium for executing parallel electronic workflows. The computer readable medium includes computer executable instructions for receiving, via a communications module, a request from a client device to add or change data for an entity, the data being associated with a plurality of products or services, each product or service having a separate, independent electronic workflow. The computer readable medium also includes computer executable instructions for initiating via the communications module, each of the plurality of independent electronic workflows by interfacing with the plurality of electronic workflows on behalf of the client device; and receiving via the communications module, a plurality of inputs related to the request and, for each input, interacting via the communications module with the plurality of independent electronic workflows, wherein at least one input has overlapping data required in a plurality of the electronic workflows. The computer readable medium also includes computer executable instructions for, prior to executing an outcome of the plurality of electronic workflows, determining a result for the client device based on the data in the request; providing to the client device via the communications module, an indication of the result; and receiving a response to the indication via the communications module, wherein when the response confirms execution of the outcome, a server device interfaces with the plurality of electronic workflows via the communications module to add or change the data according to the request on behalf of the client device.

In certain example embodiments, the server device can receive via the communications module, a revised request from the client device; and iterate the interactions with the plurality of electronic workflows to determine an alternative result for the client device.

In certain example embodiments, at least one of the request and the plurality of inputs can be obtained by providing the client device with a plurality of questions related to the plurality of electronic workflows. The server device can also access data associated with a user of the client device, analyze the data associated with the user, and automatically generate the plurality of questions based on the analysis.

In certain example embodiments, the indication of the result can be provided in a graphical user interface used by the client device to make the request to the server device. The graphical user interface can enable the client device to acquire or update multiple products or services at the same time according to the response to the indication. The products or services can include a plurality of insurance products each associated with one of the plurality of electronic workflows.

In certain example embodiments, the server device can generate a single front end electronic workflow to guide a user of the client device through applying the request to the plurality of separate, independent electronic workflows; and display the single front end electronic workflow to the client device in a graphical user interface. The single front end electronic workflow can be initiated from a financial services application or website. The financial services application or website can include an account for the user of the client device that provides access to client profile data to be used in automatically determining at least one of the plurality of inputs.

Figure 1:
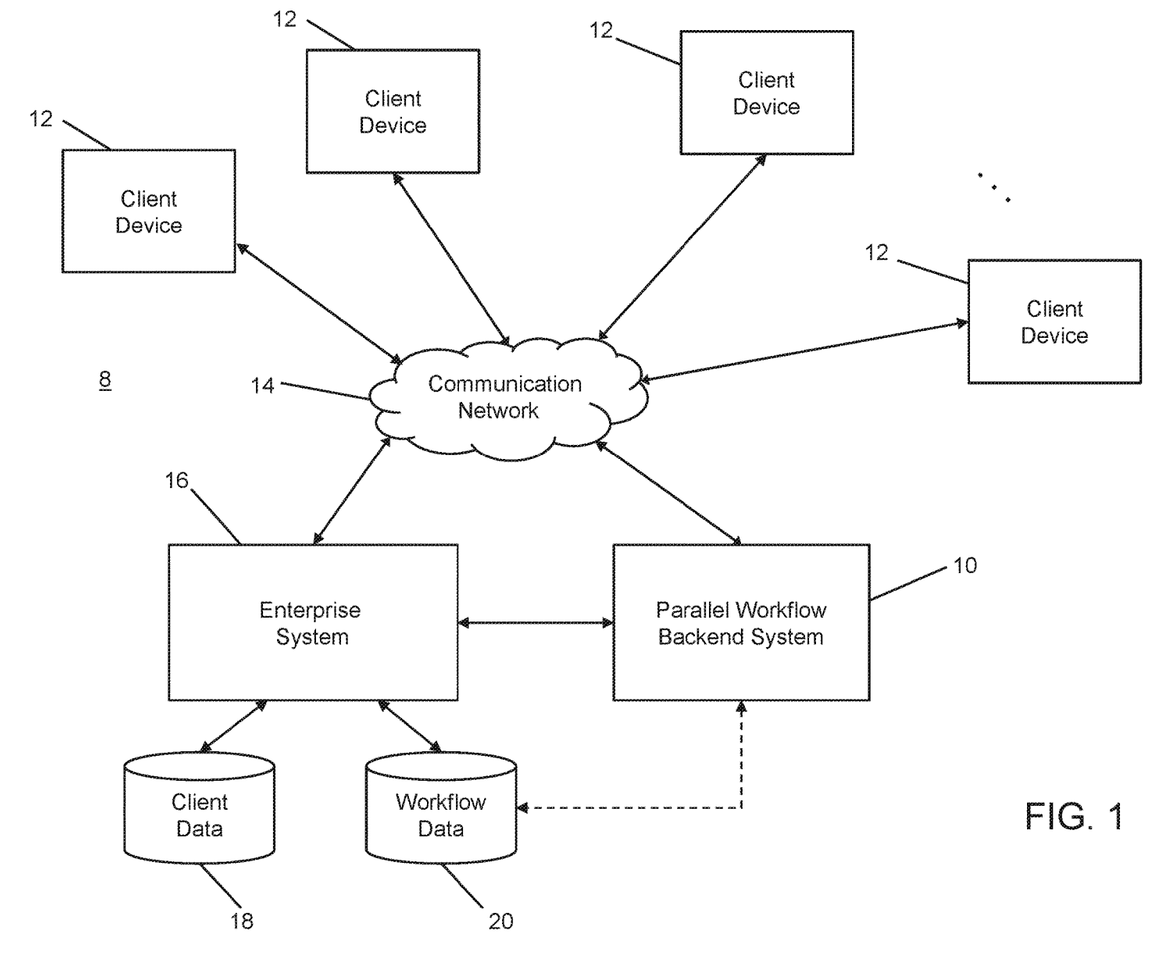
FIG. 1 is a schematic diagram of an example computing environment.

FIG. 1 illustrates an exemplary computing environment 8. In one aspect, the computing environment 8 may include a parallel workflow backend system 10, one or more client devices 12, and a communications network 14 connecting one or more components of the computing environment 8.

The computing environment 8 may also include an enterprise system 16 (e.g., a financial institution such as commercial bank and/or insurance provider) that provides financial services accounts to users and processes financial transactions associated with those financial service accounts. While several details of the enterprise system 16 have been omitted for clarity of illustration, reference will be made to FIG. 4 below for additional details.

The enterprise system 16 includes or otherwise has access to a datastore for storing client data 18 and a datastore for storing workflow data 20. The parallel workflow backend 10 may have has access to the client data 18 via the enterprise system 16. The parallel workflow backend system 10 may also have access to the workflow data 20 via the enterprise system 16 or by direct access, as shown in dashed lines in FIG. 1. The client data 18 may include both data associated with a user of a client device 12 that interacts with the parallel workflow backend system 10 and the enterprise system 16 (e.g., for obtaining insurance policies and/or participating in mobile banking) and transaction history data that is captured and provided with a transaction entry, e.g., in the graphical user interface of a mobile or web-based banking application. The data associated with a user can include client profile data that may be mapped to corresponding financial data 58 (see FIG. 4) for that user. It can be appreciated that the financial data 58 shown in FIG. 4 could also include transaction data and/or the client data 18 shown in FIG. 1 and these datastores are shown separately for illustrative purposes. The client data 18 can include both data that is associated with a client as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client data 18 or workflow data 20 may also include historical interactions and transactions associated with the parallel workflow backend system 10 and/or enterprise system 16, e.g., login history, search history, communication logs, documents, etc.

Figure 4:
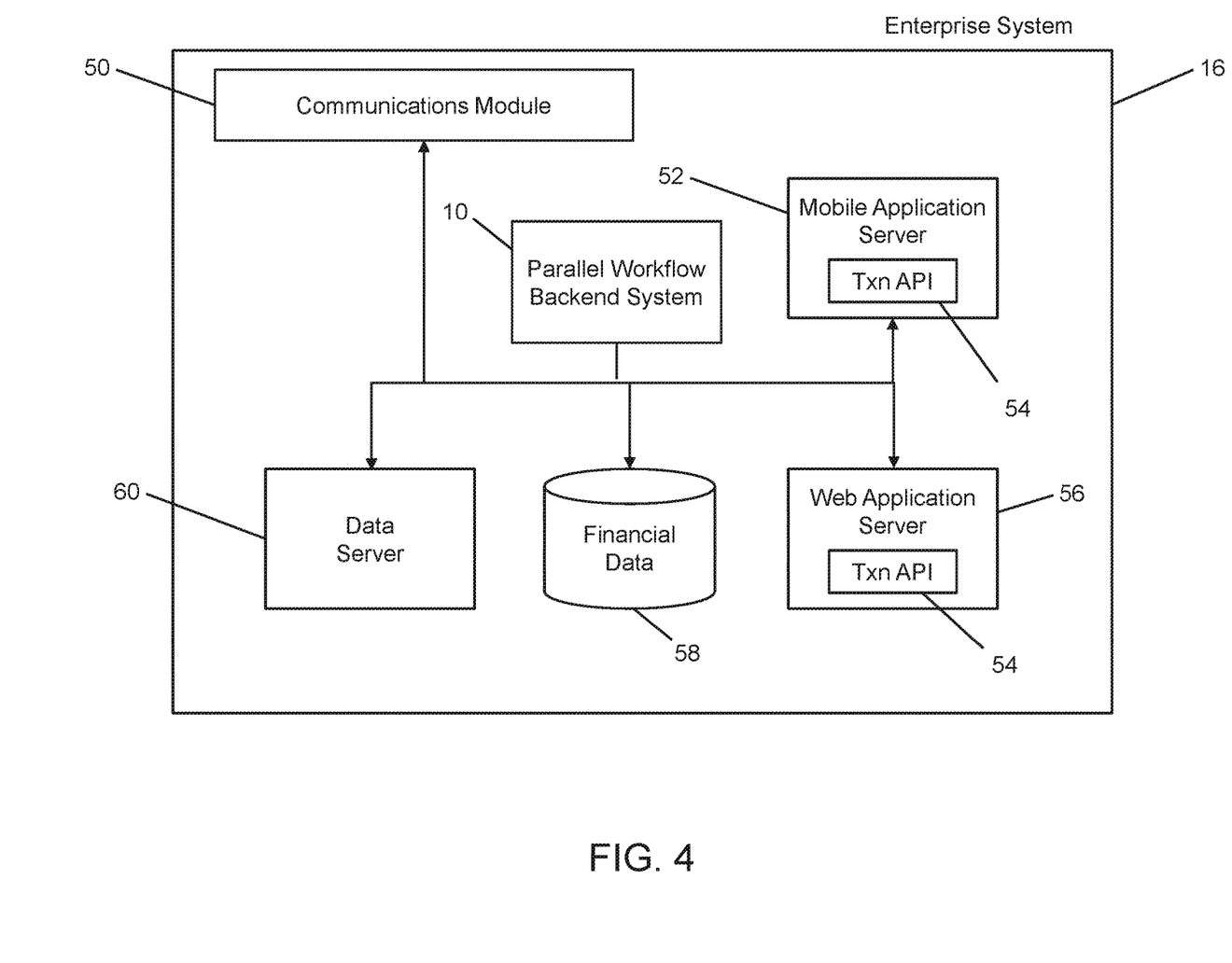
FIG. 4 is a block diagram of an example configuration of an enterprise system.

It can be appreciated that while the parallel workflow backend system 10 and enterprise system 16 are shown as separate entities in FIG. 1, they may also be part of the same system. For example, the parallel workflow backend system 10 can be hosted and provided within the enterprise system 16 as illustrated in FIG. 4.

Client devices 12 may be associated with one or more users. Users may be referred to herein as customers, clients, policy holders, correspondents, or other entities that interact with the enterprise system 16 and/or parallel workflow backend system 10 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with a mobile or web-based insurance or banking application which uses or incorporates the parallel workflow backend system 10 to assist in interfacing with multiple independent workflows to add or change information and data associated with products or services, such as insurance policies. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, parallel workflow backend system 10 may be one or more computer systems configured to process and store information and execute software instructions to perform one or more processes consistent with the disclosed embodiments. In certain embodiments, although not required, parallel workflow backend system 10 may be associated with one or more business entities. In certain embodiments, parallel workflow backend system 10 may represent or be part of any type of business entity. For example, parallel workflow backend system 10 may be a system associated with a commercial bank (e.g., enterprise system 16), a digital media service provider, or some other type of business having multiple parallel workflows such as for onboarding. The parallel workflow backend system 10 can also operate as a standalone entity that is configured to serve multiple business entities, e.g., to act as an agent therefor.

Referring back to FIG. 1, the parallel workflow backend system 10 and/or enterprise system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the parallel workflow backend system 10 and enterprise system 16. The cryptographic server may be used to protect the financial data 58 and/or client data 18 and/or workflow data 20 by way of encryption for data protection, digital signatures or message digests for data integrity, and by using digital certificates to authenticate the identity of the users and client devices 12 with which the enterprise system 16 and/or parallel workflow backend system 10 communicates to inhibit data breaches by adversaries. It can be appreciated that various cryptographic mechanisms and protocols can be chosen and implemented to suit the constraints and requirements of the particular deployment of the parallel workflow backend system 10 or enterprise system 16 as is known in the art.

Figure 2:
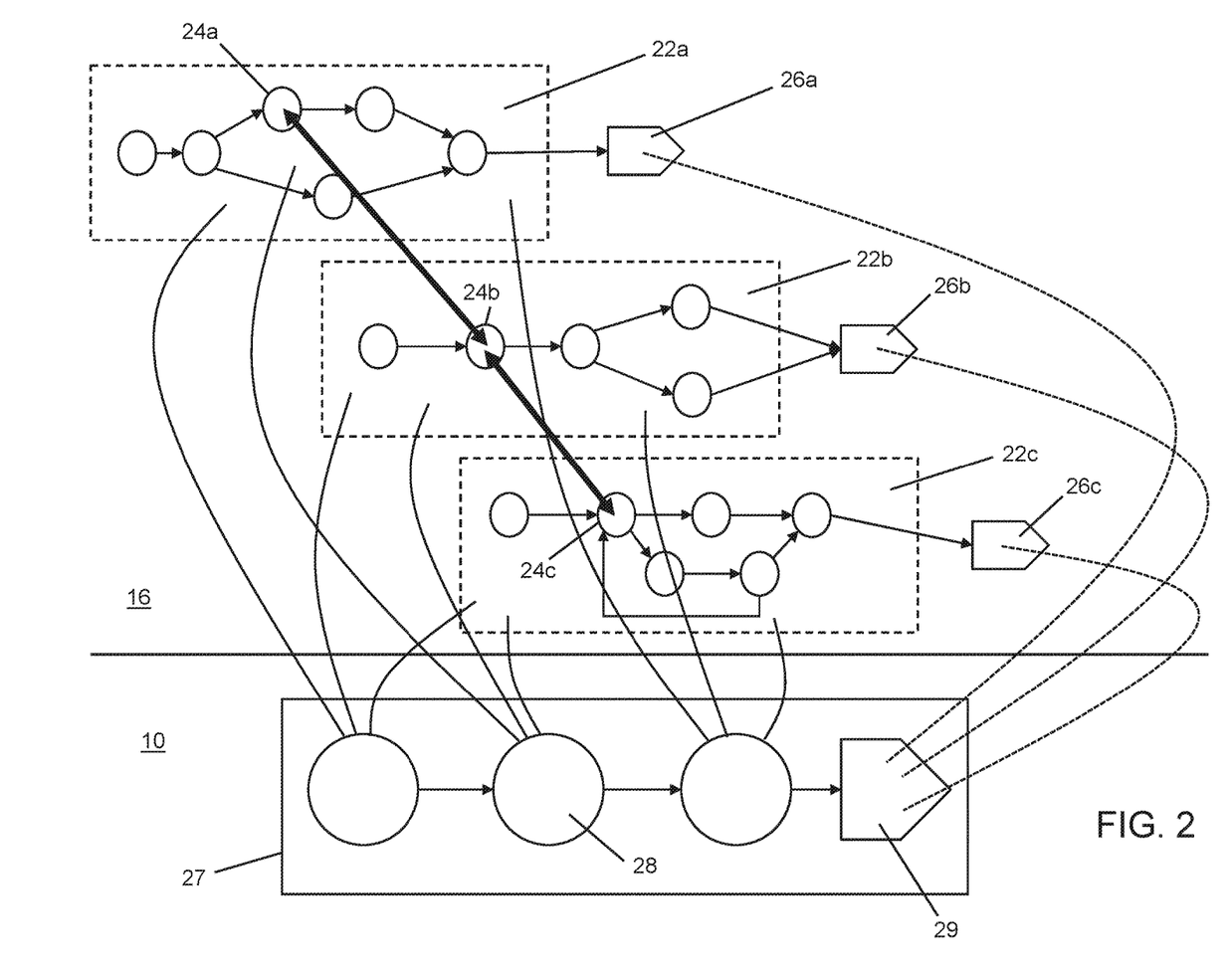
FIG. 2 is a schematic diagram of a parallel workflow backend system integrated with a series of independent workflows in an enterprise environment.

FIG. 2 provides a schematic illustration of the parallel workflow backend system 10 being integrated and interfaced with multiple parallel workflows 22 executed in the enterprise system 16 to provide a backend that allows these multiple workflows 22 to be updated and advanced in parallel, to enable the enterprise system 16 to indicate a result of additions or changes to products or services (via a front end) without the need to complete any individual workflow while revealing the result of the additions or changes. For example, the multiple workflows shown in FIG. 2 can each be associated with a different insurance policy having its own liner and independent process for making changes or issuing new policies. It can be appreciated that while three workflows are shown in FIG. 2 this is for illustration purposes only.

In FIG. 2, there is shown a first workflow 22*a* having a first result 26*a*. The first workflow 22*a* includes a number of tasks, operations, or steps, each being represented by a node 24*a*. The example workflow graphs shown in FIG. 1 are illustrative only. There is also shown a second workflow 22*b* having a number of nodes 24*b* and a second result 26*b*. There is also shown a third workflow 22*c* having a number of nodes 24*c* and a third result 26*c*. The results 26*a*, 26*b*, and 26*c* may traditionally be obtained by separately engaging each workflow, e.g., to add a new insurance policy or make changes to an existing policy, with each policy type being associated with a different workflow 22 (e.g., home, auto, travel, health, etc.).

In the schematic example shown in FIG. 2, the parallel workflow backend system 10 includes a master workflow 27 having a number of nodes 28, each being used to interface and interact with any number of the individual workflows 22 implemented by the enterprise system 16. The master workflow 27 can include a consolidated result 29 that can be used to provide an indication of multiple workflow results 26 from the parallel workflows 22 to effectively gather the outcomes of these workflows 22 on behalf of the enterprise system 16 for the client device 12 by interacting with a front end interfaced with the master workflow 27. For example, the master workflow 27 can provide a graphical user interface to consolidate the individual steps of multiple workflows 22 in a way that is transparent to the user of the client device 12. That is, the user of the client device 12 can interact with the workflows via a digital medium such as an app or website form or tool in a streamlined way while avoiding the need to individually explore each workflow or contact a live advisor to do so. An example of such a graphical user interface is shown in FIGS. 7-10, described below.

Each node 28 of the master workflow 27 can interface with any one or more of the parallel workflows 22*a*, 22*b*, 22*c* and may monitor all of the workflows 22*a*, 22*b*, 22*c* to determine steps or operations that can be consolidated. For example, the nodes 24*a*, 24*b*, 24*c* in FIG. 2 are denoted as being overlapping using bold arrows. If certain data, inputs, outcomes are common to these nodes 24*a*, 24*b*, 24*c*, a certain one of the master nodes 28 can coordinate a single input or request to advance the workflows 22*a*, 22*b*, 22*c* in parallel. Similarly, the consolidated result 29 can interface with the workflows 22*a*, 22*b*, 22*c* to hold the individual results 26*a*, 26*b*, 26*c* as pending to allow the workflows 22*a*, 22*b*, 22*c* to be advanced to the same level, thus providing a more accurate overall result. For example, rather than providing a coarse estimate of an increased cost to multiple policies or policy portions based on a few general questions, the master workflow 27 can interface directly with each of the parallel workflows 22*a*, 22*b*, 22*c* to advance these workflows to a point where an actual execution of the results 26*a*, 26*b*, 26*c* is possible. This in effect provides a "shopping cart" feature to allow the user to explore option changes, iterate or revisit certain options, while holding results 26*a*, 26*b*, 26*c*, to allow immediate execution and implementation when desired, without the need to redo steps or re-enter information.

The master workflow 27 shown in FIG. 2 can also use permissions or authorizations to access the client data 18 and pre-populate certain fields. Similarly, by having access to the client data 18, the parallel workflow backend system 10 can determine if the user of the client device 12 has other accounts that could be updated or other products or services that could leverage the progress made while interacting with the parallel workflows 22. For example, after exploring updates to multiple insurance policies, the enterprise system 16 could trigger a suggestion or message to apply for a mortgage pre-approval, line of credit, different type of insurance, credit card, or other product and then integrate a further parallel workflow 22 at the same time or subsequent to executing the consolidated result 29.

Figure 3:
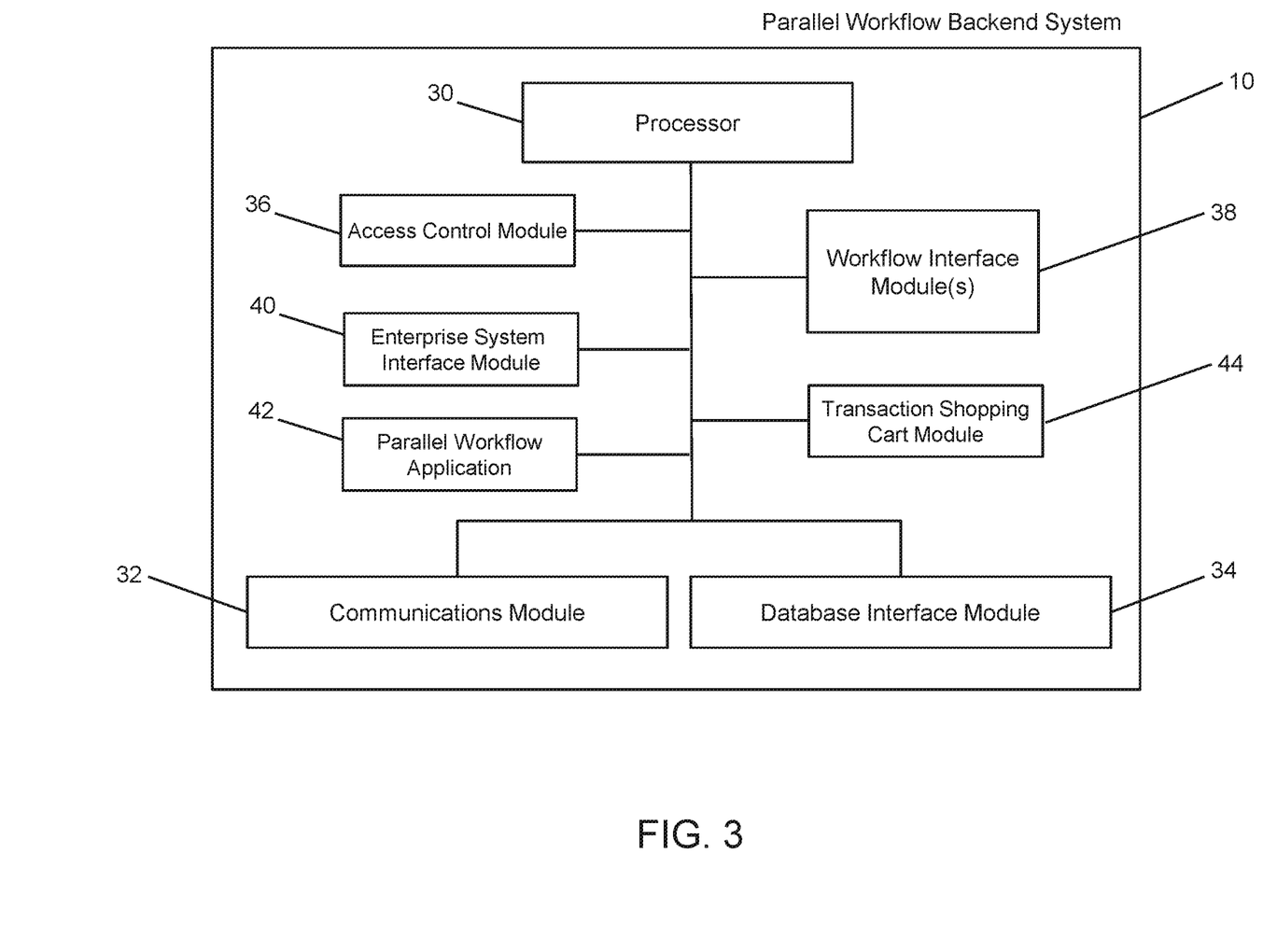
FIG. 3 is a block diagram of an example configuration of a parallel workflow backend system.

In FIG. 3, an example configuration of the parallel workflow backend system 10 is shown. In certain embodiments, the parallel workflow backend system 10 may include one or more processors 30, a communications module 32, and a database interface module 34 for interfacing with the datastore of workflow data 20 (and if permitted client data 18) to retrieve, modify, and store (e.g., add) data, Communications module 32 enables the parallel workflow backend system 10 to communicate with one or more other components of the computing environment 8, such as client device 12 (or one of its components), via a bus or other communication network, such as the communication network 14, While not delineated in FIG. 3, the parallel workflow backend system 10 includes at least one memory or memory device that can include a tangible and non-transitory computer-readable medium having stored therein computer programs, sets of instructions, code, or data to be executed by processor 30. FIG. 3 illustrates examples of modules, tools and engines stored in memory on the parallel workflow backend system 10 and operated by the processor 30. It can be appreciated that any of the modules, tools, and engines shown in FIG. 3 may also be hosted externally and be available to the parallel workflow backend system 10, e.g., via the communications module 32. In the example embodiment shown in FIG. 3, the parallel workflow backend system 10 includes an access control module 36, one or more workflow interface modules 38, an enterprise system interface module 40, a parallel workflow application 42, and a transaction shopping cart module 44.

While not shown in FIG. 3, it can be appreciated that the parallel workflow backend system 10 can also include a machine learning module and recommendation engine to enable the parallel workflow backend system 10 to analyze client data 18 or workflow data 20 to recommend other products or services or potential changes to a product or service, e.g., based on what other users have done, Such a recommendation engine may utilize or otherwise interface with the machine learning engine to both classify data currently being analyzed to generate a suggestion or recommendation, and to train classifiers using data that is continually being processed and accumulated by the parallel workflow backend system 10. This can result in a trained model used by the parallel workflow backend system 10 to perform such operations.

The access control module 36 may be used to apply a hierarchy of permission levels or otherwise apply predetermined criteria to determine what client data 18, workflow data 20, or financial data 58 can be shared with which entity in the computing environment 8. For example, the parallel workflow backend system 10 may have been granted access to certain sensitive client data 18 or financial data 58 for a user, which is associated with a certain client device 12 in the computing environment 8. Similarly, certain client profile data stored in the client data 18, workflow data 20, or financial data 58 may include potentially sensitive information such as age, date of birth, or nationality, which may not necessarily be needed by the parallel workflow backend system 10 to execute certain actions. As such, the access control module 36 can be used to control the sharing of certain client profile data or other transaction data and/or workflow data 20 and/or financial data 58 based on a type of client/user, a permission or preference, or any other restriction imposed by the computing environment 8 or application in which the parallel workflow backend system 10 is used.

The parallel workflow backend system 10 may also include one or more workflow interface modules 38 that are provided to enable workflows in the enterprise system 16 to communicate with the parallel workflow backend system 10, e.g., via an existing enterprise platform, server or other computing device. The workflow interface modules 38 can take the form of an application programming interface (API), software development kit (SDK) or any other software, plug-in, agent, or tool that allows the parallel workflow backend system 10 to be integrated with or within an application associated with the enterprise system 16 that enables the parallel workflow backend system 10 to interact with the workflows 22. The workflow interface module(s) 38 may therefore also integrate with or be provided by the enterprise system interface module 40.

The parallel workflow backend system 10 may also include a parallel workflow application 42 that enables the master workflow 27 to be displayed and interfaced with, by the user of a client device 12. The parallel workflow application 42 may also interface with or be integrated into the enterprise system interface module 40 to permit a seamless integration with existing user interfaces and tools associated with the parallel workflows 22. To that end, it can be appreciated that the workflows 22 shown in FIG. 2 can maintain their existing interfaces and front ends to allow users or advisors to interface with the workflows 22 separately and specifically in a traditional sense without altering those existing structures. As such, the master workflow 27 can be implemented as a layer beside or on top of the workflows 22 in the enterprise system 16 to permit the consolidated results 29 to be explored as an additional or alternative option or process. Also shown in FIG. 3 is a transaction shopping cart module 44, which can be used to integrate the master workflow 27 and consolidated result 29 into a traditional e-commerce shopping cart module, which can be a third-party or proprietary module.

The enterprise system interface module 40 can provide a graphical user interface (GUI) or API connectivity to communicate with the enterprise system 16 to obtain client data 18, workflow data 20 and financial data 58 for a certain user (see FIG. 4). It can be appreciated that the enterprise system interface module 40 may also provide a web browser-based interface, an application or "app" interface, a machine language interface, etc.

In FIG. 4, an example configuration of the enterprise system 16 is shown. The enterprise system 16 includes a communications module 50 that enables the enterprise system 16 to communicate with one or more other components of the computing environment 8, such as client device 12 (or one of its components) or parallel workflow backend system 10, via a bus or other communication network, such as the communication network 14. While not delineated in FIG. 4, the enterprise system 16 includes at least one memory or memory device that can include a tangible and non-transitory computer-readable medium having stored therein computer programs, sets of instructions, code, or data to be executed by one or more processors (not shown for clarity of illustration). FIG. 4 illustrates examples of servers and datastores/databases operable within the system 16, It can be appreciated that any of the components shown in FIG. 4 may also be hosted externally and be available to the system 16, e.g., via the communications module 50, In the example embodiment shown in FIG. 4, the enterprise system 16 includes one or more servers to provide access to the client data 18 (which may be included with the financial data 58 or stored separately as shown in FIG. 1) and the workflow data 20, to the parallel workflow backend system 10, to enable the parallel workflow backend system 10 to interface with parallel workflows 22 implemented by the enterprise system 16. Exemplary servers include a mobile application server 52, a web server 56 and a data server 60. Although not shown in FIG. 4, as noted above, the system 16 may also include a cryptographic server for performing cryptographic operations and providing cryptographic services. The cryptographic server can also be configured to communicate and operate with a cryptographic infrastructure. The system 16 may also include one or more data storages for storing and providing data for use in such services, such as data storage for storing financial data 58.

Mobile application server 52 supports interactions with a mobile application installed on client device 12. Mobile application server 52 can access other resources of the enterprise system 16 to carry out requests made by, and to provide content and data to, a mobile application on client device 12. In certain example embodiments, mobile application server 52 supports a mobile banking or insurance application. As shown in FIG. 4, the mobile application server 52 can include a transaction (Txn) API 54 which enables the mobile application to integrate or otherwise coordinate or work with the parallel workflow backend system 10 to provide parallel workflow integration functionality. For example, the Txn API 54 can communicate with the parallel workflow backend system 10 via the enterprise system integration module 40 and/or workflow interface module(s) 38 in the parallel workflow backend system 10 (see FIG. 3). This allows, for example, a user to communicate with the master workflow 27 to add or make changes to an account or policy associated with one or more of the independent workflows 22.

Web application server 56 supports interactions using a website accessed by a web browser application 92 (see FIG. 5) running on the client device 12. It can be appreciated that the mobile application server 52 and the web application server 56 can provide different front ends for the same application, that is, the mobile (app) and web (browser) versions of the same application. For example, the enterprise system 16 may provide an insurance or banking application that be accessed via a smartphone or tablet app while also being accessible via a browser on any browser-enabled device. As shown in FIG. 4, the web application server 56 may also include a Txn API 54 to enable the web application to integrate or otherwise coordinate or work with the parallel workflow backend system 10 to provide parallel workflow integration functionality.

The financial data 58 may be associated with users of the client devices 12 (e.g., customers of a financial institution). The financial data 58 may include any data related to or derived from financial values or metrics associated with customers of the enterprise system 16, for example, account balances, transaction histories, line of credit available, credit scores, mortgage balances, affordability metrics, investment account balances, investment values and types, insurance policies, insurability metrics, among many others. Other metrics can be associated with the financial data 58, such as financial health data that is indicative of the financial health of the users of the client devices 12. As indicated above, it can be appreciated that the client data 18 shown in FIG. 1 may include or be part of the financial data 58 held by the enterprise system 16 and is shown separately for ease of illustration and ease of reference herein.

Figure 5:
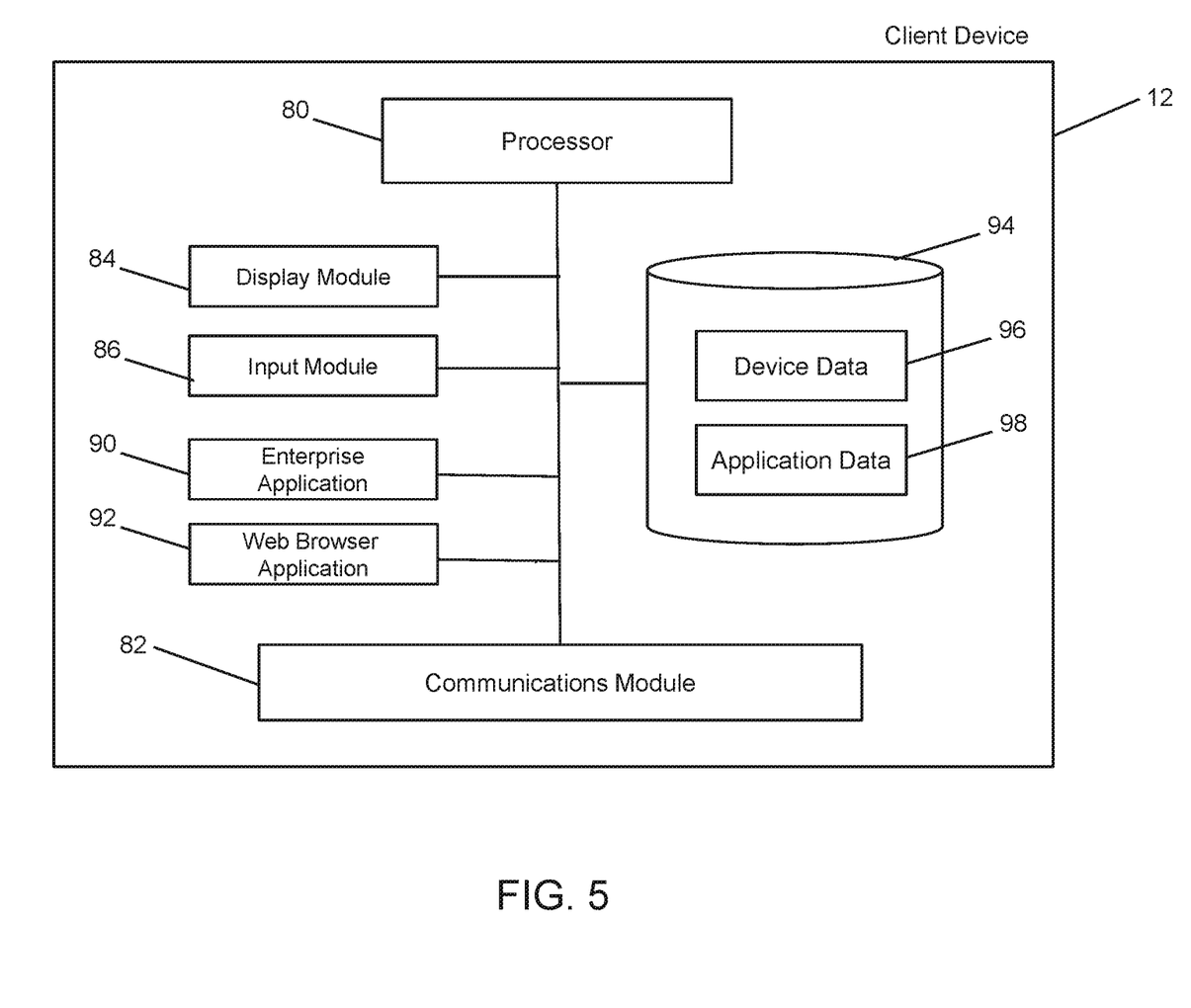
FIG. 5 is a block diagram of an example configuration of a client computing device associated with a user, customer, or client.

In FIG. 5, an example configuration of the client device 12 is shown. In certain embodiments, the client device 12 may include one or more processors 80, a communications module 82, and a data store 94 storing device data 96 and application data 98. Communications module 82 enables the client device 12 to communicate with one or more other components of the computing environment 8, such as parallel workflow backend system 10 or enterprise system 16, via a bus or other communication network, such as the communication network 14. While not delineated in FIG. 5, the client device 12 includes at least one memory or memory device that can include a tangible and non-transitory computer-readable medium having stored therein computer programs, sets of instructions, code, or data to be executed by processor 80. FIG. 5 illustrates examples of modules and applications stored in memory on the client device 12 and operated by the processor 80. It can be appreciated that any of the modules and applications shown in FIG. 5 may also be hosted externally and be available to the client device 12, e.g., via the communications module 82.

In the example embodiment shown in FIG. 5, the client device 12 includes a display module 84 for rendering GUIs and other visual outputs on a display device such as a display screen, and an input module 86 for processing user or other inputs received at the client device 12, e.g., via a touchscreen, input button, transceiver, microphone, keyboard, etc. The client device 12 may also include an enterprise application 90 provided by the enterprise system 16, e.g., for performing mobile insurance, banking, or other financial product or services. The client device 12 in this example embodiment also includes a web browser application 92 for accessing Internet-based content, e.g., via a mobile or traditional website. The data store 94 may be used to store device data 96, such as, but not limited to, an IP address or a MAC address that uniquely identifies client device 12 within environment 8. The data store 94 may also be used to store application data 98, such as, but not limited to, login credentials, user preferences, cryptographic data (e.g., cryptographic keys), etc.

It will be appreciated that only certain modules, applications, tools and engines are shown in FIGS. 3 to 5 for ease of illustration and various other components would be provided and utilized by the parallel workflow backend system 10, enterprise system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in parallel workflow backend system 10 or enterprise system 16, or client device 12, or accessible or connectable thereto. Any application or module herein described may be implemented using computer readable/executable instructions that may be stored or otherwise held by such computer readable media.

Figure 6:
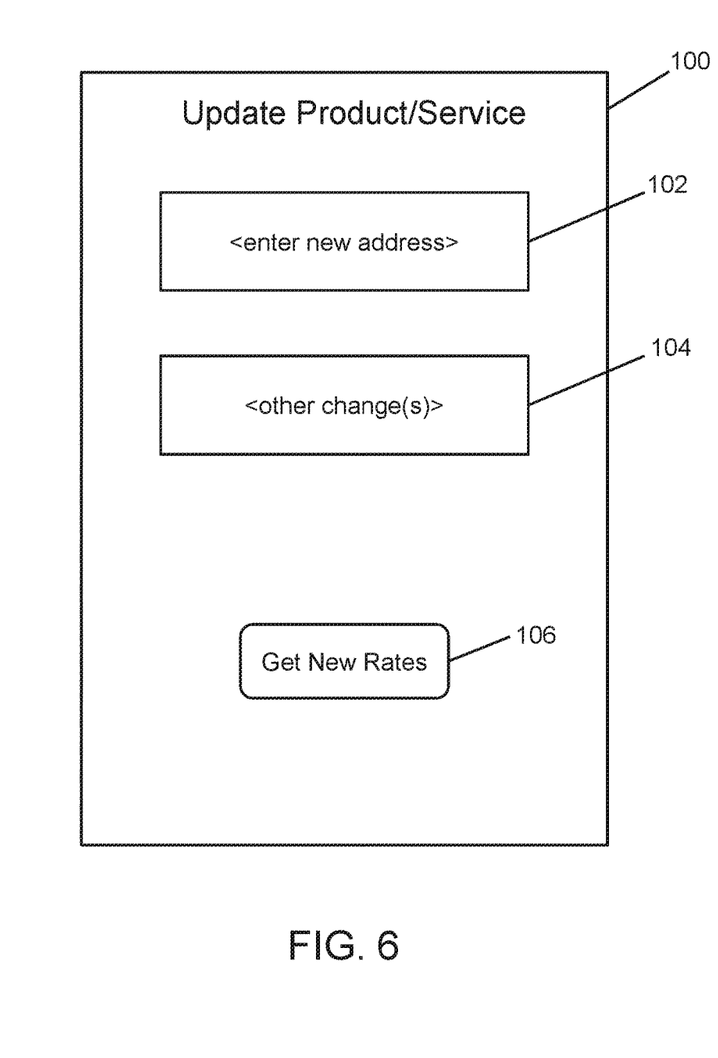
FIG. 6 is an example of a graphical user interface for updating a product or service.

Turning now to FIG. 6, a screen shot 100 of an example of a GUI for the parallel workflow application 42 is shown. It can be appreciated that the parallel workflow application 42 can be implemented as a stand-alone application or as a module or tool provided within the enterprise application 90 and/or web browser application 92 to be interacted with by the user of the client device 12. The screen shot 100 in this example provides a user interface for updating a product or service, such as an insurance policy, digital media services account, or for an onboarding or other process requiring multiple independent workflows 22 to name a few implementations. The screen shot 100 illustrates an address entry box 102 as an example of an update or change to a product or service. This example may occur in an insurance policy context when a user is moving from one premises to another, which could affect one or more of their insurance policies. At a minimum, the update to the user's mailing address may need to be processed in multiple workflows for contact purposes. An "other changes" entry box 104 is also show, to illustrate that other changes or updates may be requested at the same time, e.g. marital status, employment status, etc. A "Get New Rates" button 106 can be provided to allow the user to initiate the master workflow 27 in the backend to apply the requested update across multiple workflows 22 in the enterprise system 16, e.g., workflows 22a, 22b, and 22c as shown in FIG. 2. The master workflow 27 can then reorganize steps or operations to more efficiently advance through the workflows 22 by determining and presenting screens such as the screen shot 110 in FIG. 7 to implement the master workflow nodes 28.

Figure 7:
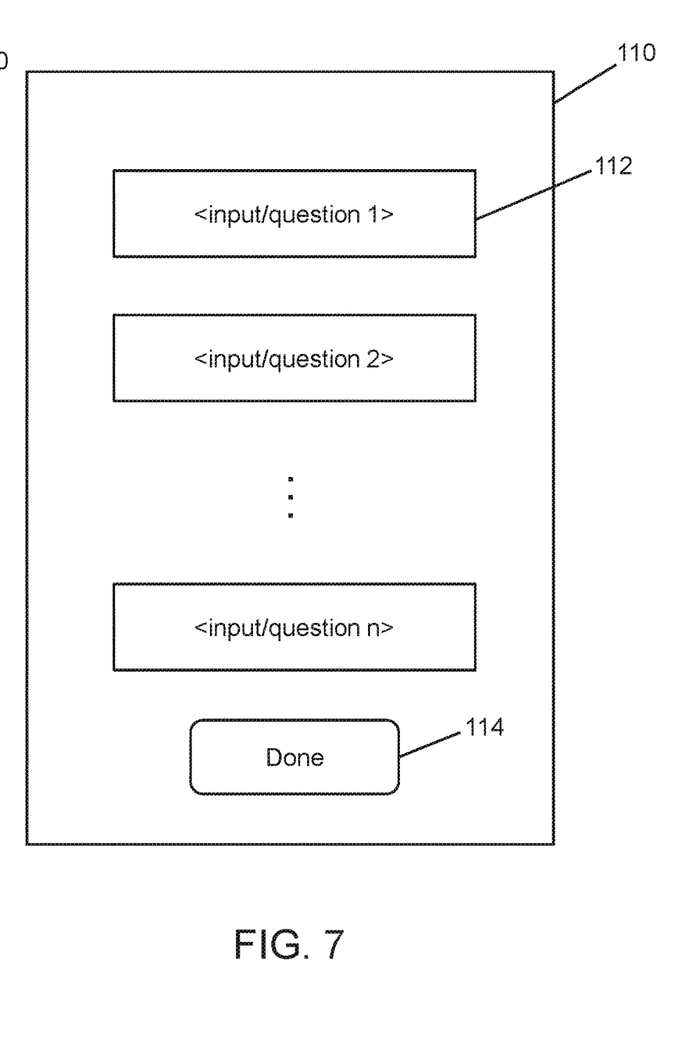
FIG. 7 is an example of a graphical user interface for obtaining inputs for updating a product or service.

In the example shown in FIG. 7, a series of input/question entry fields 112 can be presented as generically shown, to gather data and information from the user that can be provided to the individual workflows 22 by the parallel workflow backend system 10. It can be appreciated that multiple entry fields 112 can be shown in the same screen or using multiple screens or tabs or other user interface functionality. For example, registering an address change for multiple insurance policies or policy portions may require proof of the address change from a driver's license or bill payment showing the address. The master workflow 27 can obtain this information in a single input or submission by the user and have this submission applied concurrently amongst overlapping or otherwise similar nodes 24 within the affected workflows 22. This avoids the need to separately provide this information in separate linear workflows 22. The user interface shown in the screen shot 110 can also include a "Done" button 114 or other submission mechanism to have the inputs and/or replies provided to the master workflow 27.

Figure 8A:
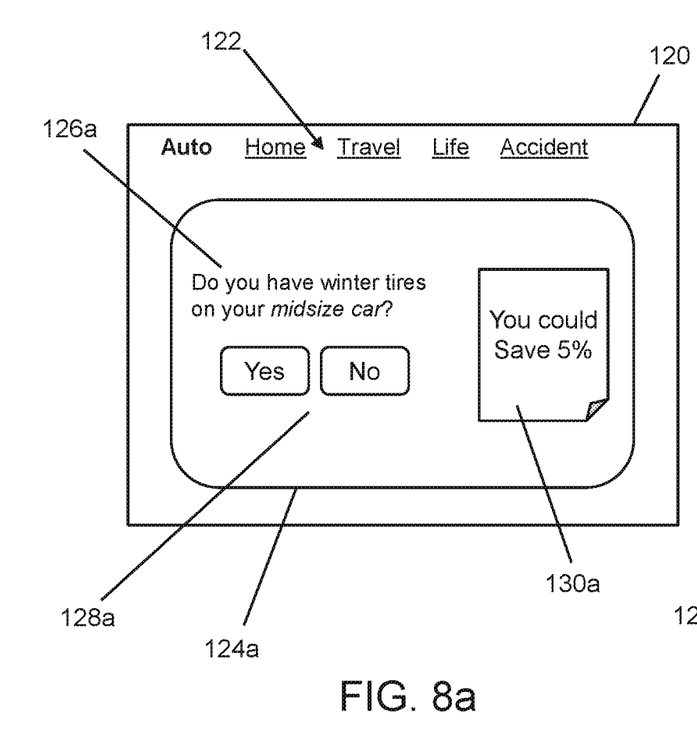
FIG. 8a is an example of a graphical user interface for updating or acquiring insurance policies.
Figure 8B:
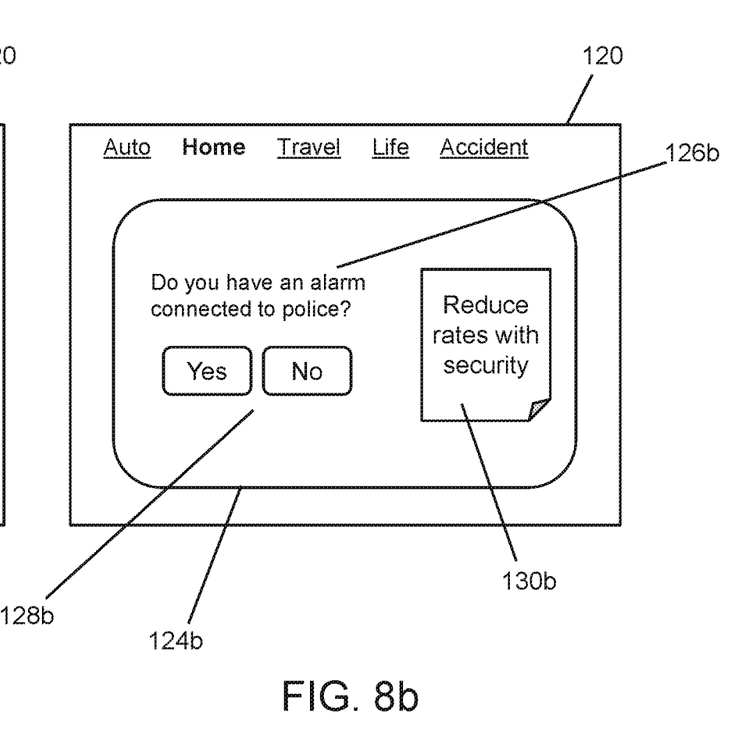
FIG. 8b is another example of a graphical user interface for updating or acquiring insurance policies.

FIGS. 8a and 8b illustrate a specific user interface example for an insurance coverage tool. In FIG. 8a, a coverage assessment tool 120 is shown, which includes a number of options 122 for different types of insurance, for example, automotive, home, travel, life, and accident. By selecting one of the options 122, a coverage assessment workflow 124a can be initiated from the master workflow 27 provided within the tool 120. In this example, the automotive (auto) option 122 has been selected and a question 126a is presented in the workflow 124a, along with response buttons 128a, i.e., "yes" and "no" buttons 128a for the question: "Do you have winter tires on your midsize cat'?". It can be appreciated that the italicized text can represent more specific information that can be pulled from the client data 18 to provide a more personalized question, i.e., by identifying the make, model or other attributes of the user's actual vehicle. A notice 130a is also shown in FIG. 8a indicating some context or importance of the question 126a, in this case that by having winter tires, a discount can be provided.

The master workflow 27 shown in FIG. 2 can be implemented with the coverage assessment tool 120 as a front end, in which the user can be navigated through the different types of insurance policies to determine if any changes or additions should be made. FIG. 8b illustrates an example for a home insurance workflow 124b, wherein the question 126b relates to having an alarm that is connected to the police, with "yes" and "no" buttons 128b provided similar to FIG. 8a. The notice 130b in this example suggests that home insurance rates can be decreased with increased security.

From FIGS. 8a and 8b it can be seen that the parallel workflow backend system 10 can be used to not only coordinate and integrate multiple independent existing workflows 22 but also provide a platform to create additional tools for updating or optimizing a product or service by creating a front end that obtains suitable information to determine if additional features or services or upgrades would be applicable and desirable to the user.

Figure 9:
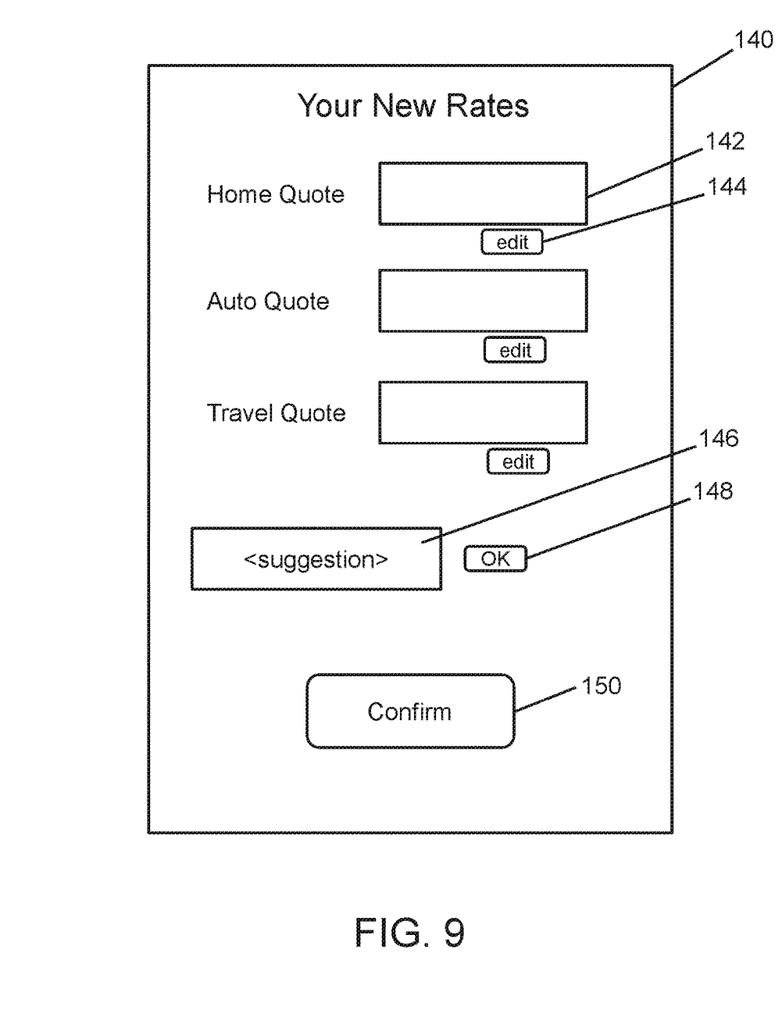
FIG. 9 is an example of a graphical user interface for displaying multiple new rates for a product or service by interfacing with multiple corresponding workflows using the parallel workflow backend system.

Turning now to FIG. 9, a screen shot 140 of an example of a user interface for providing a consolidated result 29 is shown. In this example, the master workflow 27 has used questions and input from screens such as those shown in FIGS. 6 and 7 to obtain information to advance workflows 22 related to home, auto and travel insurance policies. The master workflow 27 can hold the individual results 26 pending while providing the user with the consolidated result 29 shown in FIG. 9. It can be appreciated that the consolidated result 29 can be embodied as a "shopping cart" as indicated above and be integrated with a traditional e-commerce checkout. In the example shown in FIG. 9, an individual result indication 142 is shown, with an "edit" button 144 to allow the user to iterate through the individual workflow 22 to make changes and possibly adjust the result shown in the indication 142. It can be appreciated that the edit button 144 can be used to trigger a modified master workflow 27 or a sub-master workflow 27 to enable edits to be applied only to the associated workflow 22 for that indication 142 or can have the entire master workflow 27 reapplied. Also shown in FIG. 9 are a suggestion box 146 and an "ok" button 148 to allow additional features or services or products to be suggested and allow the user to augment the changes already being made. For example, selecting the "ok" button can cause the master workflow 27 to initiate the coverage assessment tool 120 in FIGS. 8a-8b to be launched for optimizing the various estimates. A "confirm" button 150 can also be provided to enable the user to obtain the new rates by having the parallel workflow backend system 10 execute the individual results 26.

Figure 10:
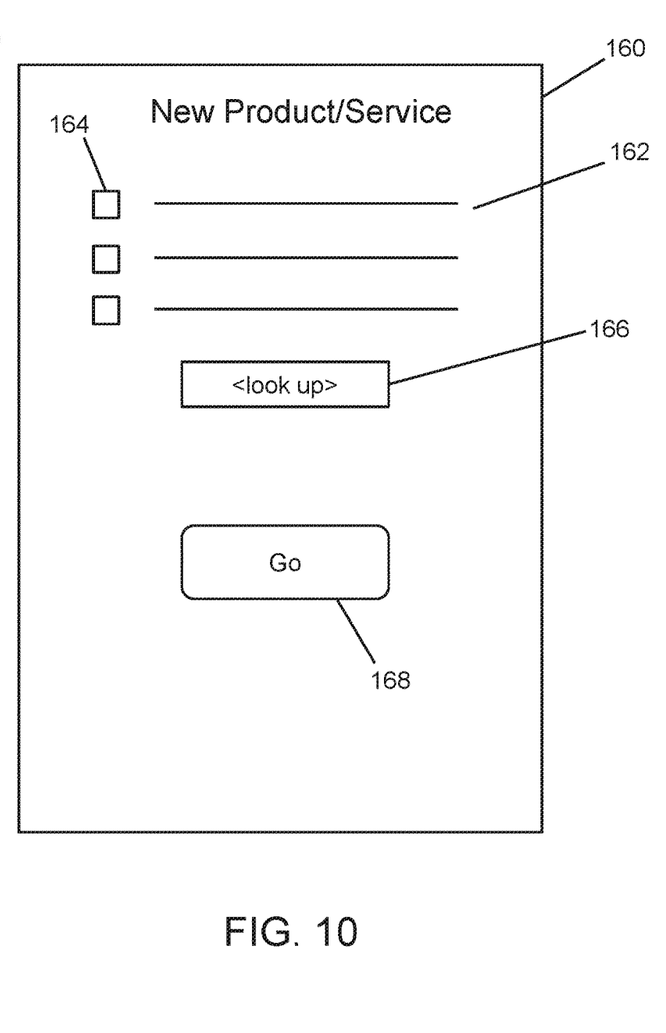
FIG. 10 is an example of a graphical user interface for requesting one or more new products or services.

FIG. 10 illustrates a screen shot 160 of a user interface for adding, selecting or purchasing new products or services associated with individual workflows 22 in the enterprise system 16, as opposed to updating or refining an existing policy or account. In this example, a list 162 of new products and services can be displayed along with checkboxes 164 for selecting desired ones from the list 162. A lookup entry box 166 can also be provided when additional options are available. A "Go" button 168 in this example can be used to initiate, for example, the interface illustrated in the screen shot 110 shown in FIG. 7 to obtain information to enable independent electronic workflows 22 to be executed and a consolidated result 29 to be presented, e.g., as shown in FIG. 9.

Figure 11:
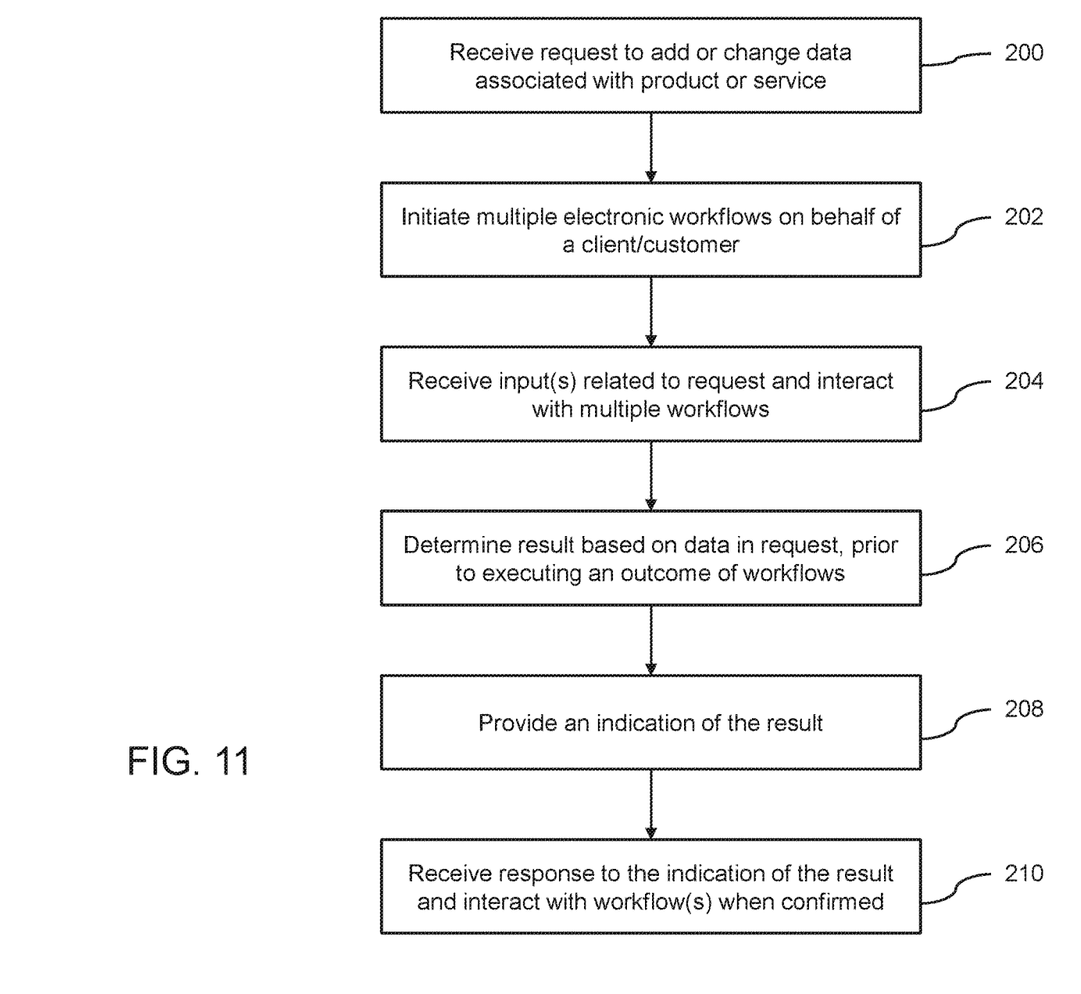
FIG. 11 is a flow diagram of an example of computer executable instructions for executing parallel electronic workflows.

Referring to FIG. 11, an example embodiment of computer executable instructions for executing parallel electronic workflows 22 is shown. At block 200, the parallel workflow backend system 10 receives a request to add or change data associated with a product or service. For example, the screen shots 100 or 160 may have been used to initiate an insurance policy change or update, or to have an additional policy added. At block 202, the parallel workflow backend system 10 can have a master workflow 27 initiated to interface with and initiate multiple independent electronic workflows 22 on behalf of the user of a client device 12, e.g., as shown in FIG. 2. At block 204, the parallel workflow backend system 10 receives one or more input related to the request and interacts with the workflows 22, e.g., by implementing nodes 28 of the master workflow 27. From these interactions, the parallel workflow backend system 10 can determine a consolidated result 29 based on the data provided in the request or other interactions with the user, at block 206. This can be done prior to executing the outcomes of the individual workflows 22, by holding the results 26 pending until a confirmation is provided. An indication of the results 26 and/or the consolidated result 29 is provided at block 208. At block 210, a response to the indication of the result is received by the parallel workflow backend system 10, which can initiate an interaction with the workflow(s) 22 when confirmed, e.g., to have the changes applied to the products and/or services, etc.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A server device for executing multiple independent electronic workflows, the server device comprising:
   a processor;
   a communications module coupled to the processor; and
   a memory coupled to the processor, the memory storing computer executable instructions that when executed by the processor cause the server device to:
   receive a request from a client device, the request comprising one or more inputs;
   determine, for each input of the request, a corresponding independent electronic workflow, wherein the corresponding independent electronic workflow requires the input to advance towards completion of tasks comprised in the corresponding independent electronic workflow, and wherein at least one input of the one or more inputs has overlapping data required to advance multiple independent electronic workflows;
   interact with each corresponding independent electronic workflow to advance each independent electronic workflow associated with the request towards completion, at least in part in parallel, based on the one or more inputs;
   prior to executing outcomes of each corresponding independent electronic workflow, determine a result for each corresponding independent electronic workflow and provide to the client device an indication of the result;
   receive a response to the indication confirming the result; and
   interface with each corresponding independent electronic workflow to complete each corresponding independent electronic workflow to the result.

2. The server device of claim 1, wherein the computer executable instructions further cause the processor to:
   receive a revised request with at least one revised input from the client device; and
   iterate the determinations of each corresponding independent electronic workflow associated with the revised request, and the interactions with each corresponding independent electronic workflow associated with the revised request, to determine at least in part an alternative result for the client device based on the at least one revised input.

3. The server device of claim 1, wherein the computer executable instructions further cause the processor to:
   provide the client device with a plurality of questions to receive one or more additional inputs associated with at least one additional independent electronic workflow; and
   interact with the at least one additional independent electronic workflow to advance the at least one additional independent electronic workflow based on the one or more additional inputs received from the client device in response to the plurality of questions.

4. The server device of claim 3, wherein the computer executable instructions further cause the processor to:
   access data associated with a user of the client device;
   analyze the data associated with the user; and
   automatically generate the plurality of questions based on the analysis.

5. The server device of claim 1, wherein the indication of the result is provided in a graphical user interface used by the client device to make the request to the server device.

6. The server device of claim 5, wherein the graphical user interface enables the client device to acquire or update multiple of a plurality of products or services according to a response to the indication.

7. The server device of claim 6, wherein the plurality of products or services comprise a plurality of insurance products each associated with one of the independent electronic workflow.

8. The server device of claim 1, wherein the computer executable instructions further cause the processor to:
   generate a single front end electronic workflow to guide a user of the client device through applying the request to each corresponding independent electronic workflow; and
   display the single front end electronic workflow to the client device in a graphical user interface.

9. The server device of claim 8, wherein the single front end electronic workflow is initiated from a financial services application or website.

10. The server device of claim 9, wherein the financial services application or website comprises an account for the user of the client device that provides access to client profile data to be used in automatically determining at least one of the one or more inputs.

11. A method of executing multiple independent electronic workflows, the method executed by a server device and comprising:
    receiving a request from a client device including one or more inputs;
    determining, for each input of the request, a corresponding independent electronic workflow, wherein the corresponding independent electronic workflow requires the input to advance towards completion of tasks comprised in the corresponding independent electronic workflow, and wherein at least one input of the one or more inputs has overlapping data required to advance multiple independent electronic workflows;
    interacting with each corresponding independent electronic workflow to advance each determined independent electronic workflow associated with the request towards completion, at least in part in parallel, based on the one or more inputs;
    prior to executing outcomes of the each corresponding independent electronic workflow, determining a result for each corresponding independent electronic workflow and providing to the client device an indication of the result;
    receiving a response to the indication confirming the result; and
    interfacing with each corresponding independent electronic workflows to complete each corresponding independent electronic workflow to the result.

12. The method of claim 11, further comprising:
    receiving a revised request with at least one revised input from the client device; and
    iterating the determinations of each corresponding independent electronic workflow associated with the revised request, and the interactions with each corresponding independent electronic workflow associated with revised request, to determine at least in part an alternative result for the client device based on the at least one revised input.

13. The method of claim 11, further comprising:
providing the client device with a plurality of questions to receive one or more additional inputs associated with at least one additional independent electronic workflow; and
interacting with the at least one additional independent electronic workflow to advance the at least one additional independent electronic workflow based on the one or more additional inputs received from the client device in response to the plurality of questions.

14. The method of claim 13, further comprising:
accessing data associated with a user of the client device;
analyzing the data associated with the user; and
automatically generating the plurality of questions based on the analysis.

15. The method of claim 11, further comprising:
generating a single front end electronic workflow to guide a user of the client device through applying the request to each corresponding independent electronic workflow; and
displaying the single front end electronic workflow to the client device in a graphical user interface.

16. The method of claim 15, wherein the single front end electronic workflow is initiated from a financial services application or website.

17. The method of claim 16, wherein the financial services application or website comprises an account for the user of the client device that provides access to client profile data to be used in automatically determining at least one of the one or more inputs.

18. The method of claim 11, comprising providing the indication of the result in a graphical user interface used by the client device to make the request to the server device.

19. The method of claim 18, wherein the graphical user interface enables the client device to acquire or update multiple of a plurality of products or services according to a response to the indication.

20. A non-transitory computer readable medium for executing parallel electronic workflows, the computer readable medium comprising computer executable instructions for:
receiving a request from a client device including one or more inputs;
determining, for each input of the request, a corresponding independent electronic workflow, wherein the corresponding independent electronic workflow requires the input to advance towards completion of tasks comprised in the corresponding independent electronic workflow, and wherein at least one input of the one or more inputs has overlapping data required to advance multiple independent electronic workflows;
interacting with each corresponding independent electronic workflow to advance each determined independent electronic workflow associated with the request towards completion, at least in part in parallel, based on the one or more inputs;
prior to executing outcomes of the each corresponding independent electronic workflow, determining a result for each corresponding independent electronic workflow and providing to the client device an indication of the result;
receiving a response to the indication confirming the result; and
interfacing with each corresponding independent electronic workflows to complete each corresponding independent electronic workflow to the result.

* * * * *